(12) United States Patent
Pajel et al.

(10) Patent No.: US 8,901,256 B2
(45) Date of Patent: Dec. 2, 2014

(54) POLYTHIOETHERS, MOISTURE CURABLE COMPOSITIONS AND METHODS FOR THEIR MANUFACTURE AND USE

(75) Inventors: Carissa Pajel, Los Angeles, CA (US); Alfredo M. Reyes, Jr., North Hollywood, CA (US); Raquel A. Keledjian, Glendale, CA (US); Gordon Zabrecky, Saugus, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 241 days.

(21) Appl. No.: 13/348,718

(22) Filed: Jan. 12, 2012

(65) Prior Publication Data

US 2013/0181161 A1 Jul. 18, 2013

(51) Int. Cl.
*C08G 75/04* (2006.01)
*C07F 7/08* (2006.01)
*C09K 3/00* (2006.01)

(52) U.S. Cl.
USPC ............... 525/535; 528/25; 528/376

(58) Field of Classification Search
USPC .............. 525/182.17, 535; 528/25, 376
See application file for complete search history.

(56) References Cited

U.S. PATENT DOCUMENTS

| | | | | |
|---|---|---|---|---|
| 3,965,067 A * | 6/1976 | Jin | ................................. | 524/109 |
| 4,366,307 A * | 12/1982 | Singh et al. | .................... | 528/373 |
| 4,496,720 A | 1/1985 | Bruynes et al. | | |
| 4,623,711 A | 11/1986 | Morris et al. | | |
| 4,698,407 A * | 10/1987 | Nakagima et al. | ............. | 528/14 |
| 4,902,736 A | 2/1990 | Nonaka et al. | | |
| 5,912,319 A | 6/1999 | Zook et al. | | |
| 6,172,179 B1 | 1/2001 | Zook et al. | | |
| 6,639,046 B1 * | 10/2003 | Van Dijk | ....................... | 528/293 |
| 7,524,564 B2 | 4/2009 | Cosman | | |
| 7,553,908 B1 | 6/2009 | Cosman et al. | | |
| 7,598,326 B2 | 10/2009 | Cosman | | |
| 7,638,162 B2 | 12/2009 | Cosman | | |
| 7,786,226 B2 | 8/2010 | Cosman | | |
| 8,143,370 B2 | 3/2012 | Lin | | |
| 2007/0184290 A1 * | 8/2007 | Ando et al. | ................... | 428/447 |
| 2010/0010133 A1 | 1/2010 | Zook et al. | | |
| 2010/0041839 A1 | 2/2010 | Anderson et al. | | |
| 2011/0319559 A1 | 12/2011 | Kania et al. | | |

FOREIGN PATENT DOCUMENTS

| | | |
|---|---|---|
| EP | 2148897 | 2/2010 |
| JP | 63053195 | 3/1988 |
| JP | 6093073 | 4/1994 |
| JP | 6271641 | 9/1994 |
| JP | 7025966 | 1/1995 |
| JP | 7025972 | 1/1995 |
| JP | 7188612 | 7/1995 |
| JP | 9255750 | 9/1997 |
| JP | 2002 363251 | 12/2012 |

OTHER PUBLICATIONS

Glass, Richard S., "A Facile Synthesis of Trimethylsilyl Thioethers", Journal of Organometallic Chemistry, Mar. 20, 1973, pp. 83-90, 61 (1973), Elsevier Sequoia S.A., Lausanne.

Matsui, Tatsuro et al., "New Liquid Polysulfide Polymer Terminated with Silyl Group", Journal of Applied Polymer Science, Apr. 27, 2004, pp. 2642-2649, vol. 93 (2004), Wiley Periodicals, Inc.

* cited by examiner

*Primary Examiner* — Mike M Dollinger
(74) *Attorney, Agent, or Firm* — Diane R. Meyers

(57) ABSTRACT

One-part moisture curable sealant compositions and methods of making the same are provided. The compositions include a silyl-functional polythioether and a polyepoxide. Methods of making sealant compositions are also provided.

24 Claims, No Drawings

POLYTHIOETHERS, MOISTURE CURABLE COMPOSITIONS AND METHODS FOR THEIR MANUFACTURE AND USE

FIELD

The present disclosure is directed to polythioethers and compositions comprising the polythioethers for use in aerospace and other applications. More particularly, the disclosure is directed to one-part, moisture-curable compositions comprising polythioethers.

BACKGROUND

Sealants useful in aerospace and other applications are often pre-mixed frozen compositions (PMF) or two-part systems. In two-part systems, a first component contains a main polymer, such as a polysulfide polymer and/or a polythioether polymer, together with a number of additional materials. The first component does not contain a curing agent, which is instead in the second component. The two components are manufactured, packaged separately, and mixed together immediately before use.

Unlike two-component systems, which require mixing the curing paste and the base before use, PMFs may be cured by external factors, such as temperature. For this reason, PMFs must be frozen at, for example, −40° F. to −80° F. in order to suppress or slow the curing reaction. When the PMFs are later brought to room temperature, the curing rate increases significantly. PMFs offer the convenience of being ready for use without mixing and therefore can be more cost- and time-effective than certain two-part systems. However, existing PMFs have limited shelf-lives, must be stored at very low temperatures such as −40° F. to −80° F., and require mixing of the base component and activator followed by immediate freezing to slow the curing reaction. The requirement to store PMFs at low temperature prior to use can be inconvenient and/or expensive.

SUMMARY

As a result, it is desirable to provide one-part aerospace sealant compositions that exhibit long shelf life at ambient temperature but, when applied to a substrate and exposed to moisture (such as atmospheric moisture), cure to form a cured sealant having acceptable properties, including good shear strength.

In a first aspect, polythioethers are disclosed comprising: (a) a backbone comprising a structure having the formula (I):

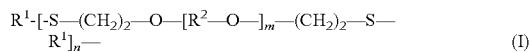

(I)

wherein (i) each $R^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, a $-[(-CH_2-)_p-X-]_q-(CH_2)_r-$ group, and a $-[(-CH_2-)_p-X-]_q-(CH_2)_r-$ group in which at least one $-CH_2-$ unit is substituted with a methyl group; (ii) each $R^2$ is independently selected from a $C_{2-10}$ n-alkylene group, a $C_{2-6}$ branched alkylene group, a $C_{6-8}$ cycloalkylene group, a $C_{6-14}$ alkylcycloalkylene group, a heterocyclic group, and a $-[(-CH_2-)_p-X-]_q-(CH_2)_r-$ group; (iii) each X is independently selected from O, S, and a $-NR^6-$ group, in which $R^6$ is selected from H and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two groups, per molecule, having the formula (II):

(II)

wherein $R^3$, $R^4$, and $R^5$ are each independently selected from a $C_{1-6}$ n-alkyl group, a $C_{1-6}$ branched alkyl group, a substituted $C_{1-6}$ n-alkyl group, and a phenyl group. The foregoing polythioethers are sometimes referred to herein as "silyl-functional polythioethers."

In a second aspect, compositions, such as one-part sealant compositions, comprising a silyl-functional polymer, a polyepoxide, and a basic oxide are disclosed.

In a third aspect, methods for making silyl-functional polythioethers are disclosed. In certain embodiments, the methods comprise reacting a thiol-functional polythioether with a halosilane. In certain methods, a thiol-functional polythioether comprises a structure having the formula (I):

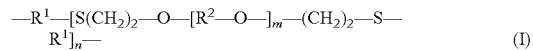

(I)

wherein (i) each $R^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, a $-[(-CH_2-)_p-X-]_q-(CH_2)_r-$ group, and a $-[(-CH_2-)_p-X-]_q-(CH_2)_r-$ group in which at least one $-CH_2-$ unit is substituted with a methyl group; (ii) each $R^2$ is independently selected from a $C_{2-10}$ n-alkylene group, a $C_{2-6}$ branched alkylene group, a $C_{6-8}$ cycloalkylene group, a $C_{6-14}$ alkylcycloalkylene group, a heterocyclic group, and a $-[(-CH_2-)_p-X-]_q-(CH_2)_r-$ group; (iii) each X is independently selected from O, S, and a $-NR^6-$ group, in which $R^6$ is selected from H and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10. The halosilane can be expressed by the general formula: $(R^3)(R^4)R^5SiX$, wherein X is halogen and $R^3$, $R^4$, and $R^5$ are each independently selected from selected from a $C_{1-6}$ n-alkyl group, a $C_{1-6}$ branched alkyl group, a substituted $C_{1-6}$ n-alkyl group, and a phenyl group.

In a fourth aspect, methods for making a one-part moisture curable composition are disclosed. These methods comprise combining a polyepoxide with a polythioether that is prepared by methods provided by the present disclosure.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range from "1 to 10" is intended to include all sub-ranges between (and including) the recited minimum value of 1 and the recited maximum value of 10, that is, having a minimum value equal to or greater than 1 and a maximum value of equal to or less than 10.

As indicated above, certain embodiments provided by the present disclosure are directed to polythioethers that comprise: (a) a backbone comprising a structure having the formula (I):

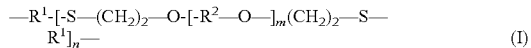

—R$^1$-[-S—(CH$_2$)$_2$—O-[-R$^2$—O—]$_m$(CH$_2$)$_2$—S—R$^1$]$_n$—     (I)

wherein (i) each R$^1$ is independently selected from a C$_{2-10}$ n-alkylene group, a C$_{2-6}$ branched alkylene group, a C$_{6-8}$ cycloalkylene group, a C$_{6-10}$ alkylcycloalkylene group, a heterocyclic group, a -[(-CH$_2$—)$_p$—X—]$_q$—(CH$_2$)$_r$— group, and a -[(-CH$_2$—)$_p$—X—]$_q$—(CH$_2$)$_r$— group in which at least one —CH$_2$— unit is substituted with a methyl group; (ii) each R$^2$ is independently selected from a C$_{2-10}$ n-alkylene group, a C$_{2-6}$ branched alkylene group, a C$_{6-8}$ cycloalkylene group, a C$_{6-14}$ alkylcycloalkylene group, a heterocyclic group, and a [(—CH$_2$—)$_p$—X—]$_q$(CH$_2$)$_r$— group; (iii) each X is independently selected from O, S, and a —NR$^6$— group, in which R$^6$ is selected from H and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two groups, per molecule, having formula (II):

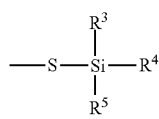

(II)

wherein R$^3$, R$^4$, and R$^5$ are independently selected from a C$_{1-6}$ n-alkyl group, a C$_{1-6}$ branched alkyl group, a substituted C$_{1-6}$ n-alkyl group, and a phenyl group are each independently a group selected from an C$_{1-6}$ alkyl group, a phenyl group, and a C$_{1-6}$ chloroalkyl group. In certain embodiments, each of R$^3$, R$^4$, and R$^5$ is independently selected from a C$_{1-6}$ alkyl group, a phenyl group, and a C$_{1-6}$ chloroalkyl group. In certain embodiments of formula (II), each of R$^3$, R$^4$, and R$^5$ is independently selected from C$_{1-6}$ alkyl, and in certain embodiments, C$_{1-3}$ alkyl. In certain embodiments of formula (II), each of R$^3$, R$^4$, and R$^5$ is the same and is methyl, in certain embodiments, ethyl, and in certain embodiments, propyl. In certain embodiments of formula (II), each of R$^3$, R$^4$, and R$^5$ is independently selected from ethyl, methyl, and propyl; and in certain embodiments, from ethyl and methyl. In certain embodiments of formula (II), the substituent is selected from halogen, —OH, and —NH$_2$.

In certain embodiments of R$^1$ and/or R$^2$ a heterocyclic group is a 5-membered heterocyclic group or a 6-membered heterocyclic group containing one or more heteroatoms selected from O, S, and —NR— wherein R is selected from hydrogen and C$_{1-3}$ alkyl.

Various methods can be used to prepare such polythioethers. In certain embodiments, a silyl-functional polythioether may be prepared by reacting a thiol-functional polythioether with a halosilane. Examples of suitable thiol-functional polythioethers, and methods for their production, which are suitable for use in methods disclosed herein, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated herein by reference. Such thiol-functional polythioethers may be difunctional, that is, linear polymers having two end groups, or polyfunctional, that is, branched polymers have three or more end groups. Suitable thiol-functional polythioethers are commercially available as PERMAPOL P3.1E from PRC-DeSoto International Inc., Sylmar, Calif.

In certain embodiments, thiol-functional polythioethers include those of formula (III):

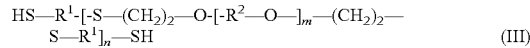

HS—R$^1$-[-S—(CH$_2$)$_2$—O-[-R$^2$—O—]$_m$—(CH$_2$)$_2$—S—R$^1$]$_n$—SH     (III)

wherein R$^1$, R$^2$, m, and n are defined as for formula (I).

Suitable thiol-functional polythioethers may be produced by reacting a divinyl ether or mixtures of divinyl ethers with an excess of dithiol or a mixtures of dithiols. For example, dithiols suitable for use in preparing such thiol-functional polythioethers include those having formula (IV):

HS—R$^7$—SH     (IV)

where R$^7$ in formula (IV) denotes a C$_{2-10}$ n-alkylene group; a C$_{2-6}$ branched alkylene group, which may have one or more pendant groups which may be, for example, hydroxyl groups, alkyl groups, such as methyl or ethyl groups, and/or alkoxy groups; a C$_{6-8}$ cycloalkylene group; a C$_{6-10}$ alkylcycloalkylene group; a -[(-CH$_2$—)$_p$—X—]$_q$—(CH$_2$)$_r$— group, or a -[(-CH$_2$—)$_p$—X—]$_q$—(CH$_2$)$_r$— group in which at least one —CH$_2$— unit is substituted with a methyl group, wherein p is an integer having a value ranging from 2 to 6, q is an integer having a value ranging from 1 to 5, r is an integer having a value ranging from 2 to 10, and X includes a heteroatom, such as O, S or another bivalent heteroatom radical; a secondary or tertiary amine group, i.e., —NR—, where R is selected from hydrogen and methyl; or another substituted trivalent heteroatom. In certain embodiments, X is selected from O and S, and thus R$^7$ in formula (IV) is -[(-CH$_2$—)$_p$—O—]$_q$—(CH$_2$)$_r$— or -[(-CH$_2$—)$_p$—S—]$_q$—(CH$_2$)$_r$—. In certain embodiments, p and r are equal, such as where p and r are both two.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., C$_{1-6}$) alkyl group, a lower alkoxy group, and a hydroxyl group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in formula (IV), R$^7$ is -[(-CH$_2$—)$_p$—

X—]$_q$—(CH$_2$)$_r$—, wherein p is 2, r is 2, q is 1, X is 5); dimercaptodioxaoctane (DMDO) (in formula (IV), R$^7$ is -[(-CH$_2$—)$_p$—X—]$_q$—(CH$_2$)$_r$—, wherein p is 2, q is 2, r is 2, X is O); and 1,5-dimercapto-3-oxapentane (in formula (IV), R$^7$ is -[(-CH$_2$—)$_p$—X—]$_q$—(CH$_2$)$_r$—, wherein p is 2, r is 2, q is 1, X is O). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Two or more different dithiols of formula (IV) may be employed if desired.

Suitable divinyl ethers include, for example, divinyl ethers having formula (V):

$$CH_2=CH-O-(-R^8-O)_m-CH=CH_2 \quad (V)$$

where R$^8$ in formula (V) is selected from a C$_{2-6}$ n-alkylene group, a C$_{2-6}$ branched alkylene group, a C$_{6-8}$ cycloalkylene group, a C$_{6-10}$ alkylcycloalkylene group, and -[(-CH$_2$—)$_p$—O—]$_q$—(—CH$_2$—)$_r$—, where p is an integer ranging from 2 to 6, q is an integer ranging from 1 to 5, and r is an integer ranging from 2 to 10. In certain embodiments of a divinyl ether of formula (V), R$^8$ is a C$_{2-6}$ n-alkylene group, a C$_{2-6}$ branched alkylene group, a C$_{6-8}$ cycloalkylene group, a C$_{6-10}$ alkylcycloalkylene group, and in certain embodiments, -[(-CH$_2$—)$_p$—O—]$_q$—(—CH$_2$—)$_r$—.

Suitable divinyl ethers include, for example, compounds having at least one oxyalkylene group, such as from 1 to 4 oxyalkylene groups, i.e., compounds in which m in formula (V) is an integer ranging from 1 to 4. In certain embodiments, m in formula (V) is an integer ranging from 2 to 4. It is also possible to employ commercially available divinyl ether mixtures that are characterized by a non-integral average value for the number of oxyalkylene units per molecule. Thus, m in formula (V) can also take on rational number values ranging from 0 to 10.0, such as from 1.0 to 10.0, from 1.0 to 4.0, or from 2.0 to 4.0.

Examples of suitable divinyl ethers include, for example, divinyl ether, ethylene glycol divinyl ether (EG-DVE) (R$^8$ in formula (V) is ethylene and m is 1), butanediol divinyl ether (BD-DVE) (R$^8$ in formula (V) is butylene and m is 1), hexanediol divinyl ether (HD-DVE) (R$^8$ in formula (V) is hexylene and m is 1), diethylene glycol divinyl ether (DEG-DVE) (R$^8$ in formula (V) is ethylene and m is 2), triethylene glycol divinyl ether (R$^8$ in formula (V) is ethylene and m is 3), tetraethylene glycol divinyl ether (R$^8$ in formula (V) is ethylene and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which R$^8$ in formula (V) is C$_{2-6}$ branched alkylene may be prepared by reacting a polyhydroxy compound with acetylene. Examples of divinlyl ethers of this type include compounds in which R$^8$ in formula (V) is an alkyl-substituted methylene group such as —CH(CH$_3$)— (for example "PLURIOL®" blends such as PLURIOL®E-200 divinyl ether (BASF Corp., Parsippany, N.J.), for which R$^8$ in formula (V) is ethylene and m is 3.8) or an alkyl-substituted ethylene (for example CH$_2$CH(CH$_3$) such as "DPE" polymeric blends including DPE-2 and DPE-3 (International Specialty Products, Wayne, N.J.)).

Other useful divinyl ethers include compounds in which R$^8$ in formula (V) is polytetrahydrofuryl (poly-THF) or polyoxyalkylene, such as those having an average of about 3 monomer units.

Two or more types of polyvinyl ether monomers of formula (V) may be used. Thus, in certain embodiments, two polythiols of formula (IV) and one polyvinyl ether monomer of formula (V), one polythiol of formula (IV) and two polyvinyl ether monomers of formula (V), two polythiols of formula (IV) and two polyvinyl ether monomers of formula (V), and more than two compounds of one or both formulas, may be used to produce a variety of thiol-functional polythioethers.

In certain embodiments, a polyvinyl ether monomer comprises 20 to less than 50 mole percent of the reactants used to prepare a thiol-functional polythioether, and, in certain embodiments, 30 to less than 50 mole percent.

In certain embodiments provided by the present disclosure, relative amounts of dithiols and divinyl ethers are selected to yield terminal thiol groups. Thus, a dithiol having formula (IV) or a mixture of at least two different dithiols having formula (IV), are reacted with of a divinyl ether having formula (V) or a mixture of at least two different divinyl ethers having formula (V) in relative amounts such that the molar ratio of thiol groups to vinyl groups is greater than 1:1, such as 1.1 to 2.0:1.0.

The reaction between compounds of formula (IV) and formula (V) may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The reaction may also be effected by irradiation with ultraviolet light either with or without a cationic photo-initiating moiety. Ionic catalysis methods, using either inorganic or organic bases, e.g., triethylamine, also yield useful materials.

Thiol-functional polythioethers suitable for use in preparing silyl-functional polythioethers provided by the present disclosure may be prepared by combining at least one compound of formula (IV) and at least one compound of formula (V) followed by addition of an appropriate catalyst, and carrying out the reaction at a temperature from 30° C. to 120° C., such as 70° C. to 90° C., for a time from 2 to 24 hours, such as 2 to 6 hours.

In certain embodiments, a thiol-functional polythioether has the structure of formula (III):

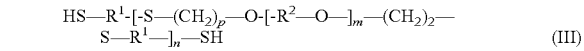

$$HS-R^1-[-S-(CH_2)_p-O-[-R^2-O-]_m-(CH_2)_2-S-R^1-]_n-SH \quad (III)$$

wherein each R$^1$ in formula (III) independently denotes a C$_{2-10}$ n-alkylene group, a C$_{2-6}$ branched alkylene group, a C$_{6-8}$ cycloalkylene group, a C$_{6-10}$ alkylcycloalkylene group, a heterocyclic group, a -[(-CH$_2$—)$_p$—X—]$_q$—(—CH$_2$—)$_r$— group, and a -[(-CH$_2$—)$_p$—X—]$_q$—(—CH$_2$—)$_r$— groups in which at least one —CH$_2$— unit is substituted with a methyl group, wherein p is an integer ranging from 2 to 6, q is an integer ranging from 1 to 5, r is an integer ranging from 2 to 10, and X denotes O, S, or —NHR—, wherein R denotes H or a methyl group; each R$^2$ in formula (III) independently denotes methylene, a C$_{2-10}$ n-alkylene group, a C$_{2-6}$ branched alkylene group, a C$_{6-8}$ cycloalkylene group, a C$_{6-14}$ alkylcycloalkylene, a heterocyclic group, or a -[(-CH$_2$—)$_p$—X—]$_q$—(—CH$_2$—)$_r$—; wherein p is an integer ranging from 2 to 6, q is an integer ranging from 1 to 5, r is an integer ranging from 2 to 10, and X is selected O, S, and —NHR—, wherein R denotes H or a methyl group; m in formula (III) is a rational number having a value ranging from 0 to 50; n in formula (III) is an integer ranging from 1 to 60; and p in formula (III) is an integer ranging from 2 to 6.

Thus, in certain embodiments, a thiol-functional polyther used to prepare polythioethers provided by the present disclosure has the structure of formula (IIIa):

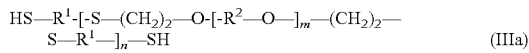

wherein $R^1$, $R^2$, m, and n are as described above with reference to formula (III). In certain embodiments, $R^1$ in formula (IIIa) is $-[(-CH_2-)_p-X-]_q-(CH_2)_r-$, where p is 2, X is O, q is 2, r is 2, $R^2$ is ethylene, m is 2, and n is 9.

As disclosed herein, thiol-functional polythioethers suitable for use in preparing polythioethers provided by the present disclosure may also be polyfunctional, i.e., may have an average functionality of greater than 2.0. Suitable polyfunctional thiol-functional polythioethers include, for example, those having the structure (VI):

$$B(-A-SH)_z \qquad (VI)$$

wherein: (i) A denotes a structure of formula (I), (ii) B denotes a z-valent residue of a polyfunctionalizing agent; and (iii) z has an average value of greater than 2.0, and, in certain embodiments, a value between 2 and 3, a value between 2 and 4, a value between 3 and 6, and in certain embodiments, is an integer of from 3 to 6.

Polyfunctionalizing agents suitable for use in preparing such polyfunctional thiol-functional polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated herein by reference.

As a result, thiol-functional polythioethers suitable for use in embodiments provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be affected by factors such as stoichiometry, as will be understood by those skilled in the art.

Thiol-functional polythioethers provided by the present disclosure having a functionality greater than 2.0 may be prepared in a manner similar to the difunctional thiol-functional polythioethers described herein. In certain embodiments, such polythioethers may be prepared by combining (i) one or more dithiols described herein, with (ii) one or more divinyl ethers described herein, and (iii) one or more polyfunctionalizing agents. The mixture may then be reacted, optionally in the presence of a suitable catalyst as described herein, to afford a thiol-functional polythioether having a functionality greater than 2.0.

In certain embodiments, thiol-functional polythioethers used to prepare polythioethers provided by the present disclosure are essentially free, or free, of sulfone, ester and/or disulfide linkages. As used herein, "essentially free of sulfone, ester, and/or disulfide linkages" means that less than 2 mole percent of the linkages in the thiol-functional polymer are sulfone, ester, and/or disulfide linkages. As a result, in certain embodiments, the resulting silyl-functional polythioethers are also essentially free, or free, of sulfone, ester, and/or disulfide linkages.

Silyl-functional polythioethers provided by the present disclosure may be prepared by reacting any of the thiol-functional polythioethers disclosed herein with a halosilane expressed by the general formula $(R^3)(R^4)R^5SiX$, wherein X represents a halogen atom such as Cl, Br, or I, and $R^3$, $R^4$, and $R^5$ are each independently selected from a $C_{1-6}$ n-alkyl group, a $C_{1-6}$ branched alkyl group, a substituted $C_{1-6}$ n-alkyl group, and a phenyl group.

Examples of suitable halosilanes include trimethylchlorosilane, triethylchlorosilane, tripropylchlorosilane, tributylchlorosilane, trimethylbromosilane, triethylbromosilane, triisopropylbromosilane, tributylbromosilane, trimethyliodosilane, triethyliodosilane, tripropyliodosilane, tributyliodosilane, trimethylfluorosilane, triethylfluorosilane, tripropylfluorosilane, tributylfluorosilane, dimethylphenylchlorosilane, chloromethyldimethylchlorosilane, and combinations of any of the foregoing.

In certain embodiments, a halosilane may be reacted with a thiol-functional polythioether in an amount sufficient to provide a silyl-functional polythioether comprising at least two groups having formula (II). In certain embodiments, the molar ratio of halosilanes to thiol groups is at least 1:1, such as from 1.05 to 2.5:1, from 1.05 to 2.0:1, from 1.5 to 3.0:1, from 2 to 3.5:1, and in certain embodiments, from 2.5 to 3.5:1.

Polythioethers provided by the present disclosure may be prepared by combining one or more thiol-functional polythioethers and one or more halosilanes, optionally in the presence of a solvent, such as toluene, and/or an agent to neutralize the halogen acid reaction by product (such as a tertiary alkylamine, including those according to the formula $R_3N$, wherein each R may be the same or different and is a $C_{1-6}$ alkyl), and carrying out the reaction at a temperature from 25° C. to 120° C. for a time from 2 to 24 hours. In certain embodiments, the reaction may be carried out at a temperature from 70° C. to 90° C. for a time from 2 to 6 hours. The Examples herein are illustrative of suitable methods for carrying out this reaction.

As a result, certain embodiments provided by the present disclosure are directed to methods for making a silyl-functional polythioether. Certain methods comprise reacting a thiol-functional polythioether with a halosilane. In these methods, a thiol-functional polythioether comprises a structure having the formula (I):

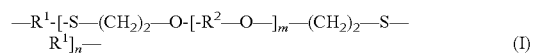

wherein (i) each $R^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, a $-[(-CH_2-)_p-X-]_q-(CH_2)_r-$ group, and a $-[(-CH_2-)_p-X-]_q-(CH_2)_r-$ group in which at least one $-CH_2-$ unit is substituted with a methyl group; (ii) each $R^2$ is independently selected from a $C_{2-10}$ n-alkylene group, a $C_{2-6}$ branched alkylene group, a $C_{6-8}$ cycloalkylene group, a $C_{6-14}$ alkylcycloalkylene group, a heterocyclic group, and a $-[(-CH_2-)_p-X-]_q-(CH_2)_r-$ group; (iii) each X is independently selected from O, S, and a $-NR^6-$ group, in which $R^6$ is selected from H and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10.

In addition, the halosilane is expressed by the general formula $(R^3)(R^4)R^5SiX$, wherein X represents a halogen atom such as Cl, Br, or I, and $R^3$, $R^4$, and $R^5$ are each independently a group selected from a $C_{1-6}$ n-alkyl group, a $C_{1-6}$ branched alkyl group, a substituted $C_{1-6}$ n-alkyl group, and a phenyl group. In certain embodiments of formula $(R^3)(R^4)R^5SiX$, each of $R^3$, $R^4$, and $R^5$ is the same and is methyl, in certain embodiments, ethyl, and in certain embodiments, propyl. In certain embodiments of formula $(R^3)(R^4)R^5SiX$, each of $R^3$, $R^4$, and $R^5$ is independently selected from ethyl, methyl, and propyl; and in certain embodiments, from ethyl and methyl. In certain embodiments of formula $(R^3)(R^4)R^5SiX$, X is Cl, in certain embodiments, Br, and in certain embodiments, I.

Silyl-functional polythioethers provided by the present disclosure are useful in compositions, such as coatings and sealant compositions, including those that may be employed as aerospace sealants and as linings for fuel tanks. As a result, certain embodiments provided by the present disclosure are directed to compositions, such as one-part compositions, that include a silyl-functional polythioether and a curing agent. In these one-part compositions, a silyl-functional polythioether and curing agent, optionally in combination with other composition components, are combined and packaged in a single, moisture-sealed container to substantially prevent curing prior to use. The compositions are stable under conditions substantially free of moisture and at ambient temperatures. As used herein, "free of moisture" and "substantially free of moisture" means that, although a composition may contain some moisture, the amount of moisture is not sufficient to substantially effect curing of the composition. When a composition is exposed to sufficient moisture, curing of the composition is promoted to form a sealant useful in many applications, including, for example, aerospace and similar applications.

In certain embodiments, such compositions may comprise other silyl-functional polymers in addition to the previously described silyl-functional polythioethers. For example, in certain embodiments, compositions provided by the present disclosure may comprise a silyl-functional polysulfide, such as, for example, a silyl-functional polysulfide derived from a polysulfide of the type described in U.S. Pat. No. 7,786,226 at col. 1, line 57 to col. 2, line 18, the cited portion of which is incorporated herein by reference. In certain embodiments, such compositions may further comprise a silyl-functional polymer derived from a mercaptan-functional polysulfide polymer of the formula $HS(RSS)_nRSH$, wherein R is —$C_2H_4$—O—$CH_2O$—$C_2H_4$— and n is such that the molecular weight of the polymer is from 1,000 to 4,000, such as 1,000 to 2,500, such as is described in U.S. Pat. No. 4,623,711 at col. 4, line 18 to col. 8, line 35, the cited portion of which is incorporated herein by reference. Such thiol-functional polymers may be made silyl-functional by reaction with a halosilane, as described herein with respect to silyl-functional polythioethers.

In certain embodiments, silyl-functional polythioethers provided by the present disclosure may be present in a composition in an amount from 30 to 90 percent by weight, such as from 40 to 80 percent by weight, or, in certain embodiments, from 45 to 75 percent by weight, based on the total weight of all non-volatile components of the composition.

Curing agents useful in compositions provided by the present disclosure include, for example, polyepoxide resins such as hydantoin diepoxide, diglycidyl ether of bisphenol-A, diglycidyl ether of bisphenol-F, Novolak type epoxies, and any of the epoxidized unsaturated and phenolic resins.

In certain embodiments, a composition contains 90% to 150% of the stoichiometric amount, such as 95% to 125% of the stoichiometric amount, of the curing agent(s).

Compositions provided by the present disclosure are curable upon exposure to ambient air. Upon exposure to humidity in the air, the silyl group of formula (II) hydrolyzes and is thereby converted to a thiol group. The resultant thiol groups may be cured in the presence of a curing agent.

In certain embodiments, compositions provided by the present disclosure comprise a filler. Examples of suitable fillers include carbon black, calcium carbonate, silica, polymer powders, and a combination of any of the foregoing. In certain embodiments, one or more fillers are present in a composition in an amount ranging from 5% to 60% by weight, from 10% to 60% by weight, from 20% to 60% by weight, and in certain embodiments, from 30% to 60% by weight, based on the total weight of the composition.

In certain embodiments, compositions provided by the present disclosure include lightweight filler particles. As used herein, the term "lightweight" when used with reference to such particles means that the particles have a specific gravity of no more than 0.7, in certain embodiments no more than 0.25, and in certain embodiments, no more than 0.1. Suitable lightweight filler particles often fall within two categories— microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (ECCOSPHERES®, W. R. Grace & Co.). Other examples include alumina/silica microspheres having particle sizes in the range of 5 to 300 microns and a specific gravity of 0.7 (FILLITE®, Pluess-Stauffer International), aluminum silicate microspheres having a specific gravity of from about 0.45 to about 0.7 (Z-LIGHT®), and calcium carbonate-coated polyvinylidene copolymer microspheres having a specific gravity of 0.13 (DUALITE 6001AE®, Pierce & Stevens Corp.). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2]octane), and combinations of any of the foregoing. When used, the additives may be present in a composition in an amount ranging, for example, from about 0% to 60% by weight. In certain embodiments, additives may be present in a composition in an amount ranging from about 25% to 60% by weight.

In certain embodiments, compositions provided by the present disclosure comprise a basic oxide. In fact, it has been discovered that such compounds are particularly desirable in the compositions described herein because they act as dehydrating agents, thereby preventing premature cure of the composition, but when cure is desired, the base that is generated acts as a curing catalyst in the compositions described herein. As a result, it has been discovered that it is possible to use less cure accelerator, such as an amine, in compositions provided by the present disclosure, which may further extend the shelf-life of the compositions. Examples of basic oxides that are suitable for use in compositions provided by the present disclosure include calcium oxide, magnesium oxide, barium oxide, or a combination of any of the foregoing. In certain embodiments of compositions provided by the present disclosure, a basic oxide is present in an amount of 0.1 to 10 percent by weight, such as 1 to 10, or, in certain embodiments, 5 to 10 percent by weight, based on the total weight of the composition.

As a result, certain embodiments provided by the present disclosure are directed to compositions comprising: (a) a silyl-functional polymer; (b) a polyepoxide, such as any of the polyepoxides disclosed herein; and (c) a basic oxide. As used herein, the term "silyl-functional polymer" refers to a polymer comprising at least one, in certain embodiments at least two, or, in certain embodiments, at least three, groups, per molecule, having formula (II):

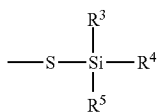
(II)

wherein $R^3$, $R^4$, and $R^5$ are each independently a group selected from a $C_{1-6}$ n-alkyl group, a $C_{1-6}$ branched alkyl group, a substituted $C_{1-6}$ n-alkyl group, and a phenyl group. In certain embodiments, a silyl-functional polymer further comprises sulfur-containing linkages in the polymer backbone, such as is the cases with the silyl-functional polythioethers described herein and polysulfide polymers, i.e., polymers comprising multiple SS linkages in the polymer backbone. In certain embodiments, a silyl-functional polymer comprises a silyl-functional polythioether as disclosed herein, a silyl-functional polysulfide as disclosed herein, and in certain embodiments, a combination thereof. In certain embodiments, a silyl-functional polymer comprises a silyl-functional polythioether comprising (a) a backbone comprising a structure having formula (I); and (b) at least two groups, per molecule, having formula (II).

In certain embodiments, compositions provided by the present disclosure provide a cured sealant having a lap shear strength of >200 psi, such as at least 220 psi, or, in certain embodiments, at least 250 psi, when measured according to Paragraph 7.8 of AS 5127/1.

In certain embodiments, for storage and transportation, the composition components, including a silyl-functional polythioether and curing agent, are combined in a container and sealed from moisture. While sealed from moisture in the container, the composition is stable and remains substantially uncured for an extended time period.

Illustrating certain embodiments of the invention are the following examples that are not to be considered as limiting the invention as to their details. All parts and percentages in the examples, as well as throughout the specification, are by weight unless otherwise indicated.

EXAMPLE 1

Synthesis of Silyl-Functional Polythioether Polymer 1402.00 g of PERMAPOL P3.1E (a mercaptan-terminated polythioether polymer, available from PRC-Desoto International Inc., Sylmar, Calif.), 511.85 mL of toluene, and 152.35 g of triethylamine were added to a 2-liter, 3-necked round bottom, fitted with a thermocouple and addition funnel. The reaction mixture was stirred for approximately 30 minutes. 166.86 g of triethylchlorosilane was added to an addition funnel and slowly added to the reaction mixture drop-wise at room temperature over the course of 30 minutes, while maintaining the temperature below 30° C. After complete addition of triethylchlorosilane, the reaction was stirred for 2-16 hours. After this, the reaction mixture was diluted with toluene, filtered over a 40-60 micron, fitted funnel, and stored in a moisture-proof container.

EXAMPLE 2

Composition of Moisture-Curable Sealant Formulation

A moisture-curable sealant composition was made by combining the components according to Table 1. 100 g of the silyl-functional polythioether polymer from Example 1 was first blended with 3.30 g of T-3917, 3.00 g of T-3920, and 0.75 g of T-3921 (PRC-Desoto International, Inc., Sylmar, Calif.). Then, 10.00 g of calcium oxide, 7.25 g of silica and 5.25 g of carbon black were added to the mixture and thoroughly mixed. Then, 17.06 g of epoxy resin (DEN 431, Dow Chemical) and 1.25 g of Silquest® A-187 were added to the mixture and thoroughly mixed. Finally, the mixture was vacuum-degassed for 15 minutes.

Lap shear samples were prepared according to Paragraph 7.8 of AS5127/1. The samples were cured for 14 days at 75° F./50% relative humidity. The lap shear values are reported in Table 4.

TABLE 1

| Composition | Weight, grams |
|---|---|
| Silyl-functional polythioether of Example 1 | 100 |
| Epoxy Resin | 17.06 |
| T-3917 | 3.3 |
| T-3920 | 3 |
| T-3921 | 0.75 |
| Calcium Oxide | 10 |
| Silica | 7.25 |
| Carbon Black | 5.25 |
| Silquest ® A-187 | 1.25 |

COMPARATIVE EXAMPLE 3

Synthesis of Silyl-Functional Polysulfide Polymer

A silyl-functional polysulfide polymer was made according to U.S. Pat. No. 4,902,736. 118.00 g of polysulfide polymer (Thioplast G-1, available from Akzo Nobel), 64.38 mL of toluene, and 13.04 g of triethylamine were added to a 500-mL, 3-necked round bottom, fitted with a thermocouple, and addition funnel. The reaction mixture was stirred for approximately 30 minutes. 13.99 g of triethylchlorosilane was added to an addition funnel, and slowly added to the reaction mixture, drop-wise, at room temperature, over the course of 30 minutes, while maintaining the temperature below 30° C. After complete addition of triethylchlorosilane, the reaction was allowed to stir for 2-16 hours. After this, the reaction mixture was diluted with toluene, filtered over a 40-60 micron, flitted funnel, and stored in a moisture-proof container.

COMPARATIVE EXAMPLE 4

Composition of Moisture-Curable Sealant Formulation

A moisture-curable sealant composition was made by combining the components according to Table 2. 100 g of silyl-functional polysulfide polymer of Comparative Example 3 was first blended with 3.30 g of T-3917, 3.00 g of T-3920 and 0.75 g of T-3921 (PRC-Desoto International, Inc., Sylmar, Calif.). Then, 10.00 g of calcium oxide, 7.25 g of silica, and 5.25 g of carbon black were added to the mixture and thoroughly mixed. Then, 17.06 g of epoxy resin (DEN 431, available from Dow Chemical) and 1.25 g of Silquest® A-187 were added to the mixture and thoroughly mixed. Finally, the mixture was vacuum-degassed for 15 minutes.

Lap shear samples were prepared according to Para. 7.8 of AS5127/1. The samples were allowed to cure for 14 days at 75° F./50% relative humidity. The lap shear values are reported in Table 4.

TABLE 2

| Composition | Weight, grams |
|---|---|
| Silyl-functional polysulfide of Example 3 | 100 |
| Epoxy Resin | 17.06 |
| T-3917 | 3.3 |
| T-3920 | 3 |
| T-3921 | 0.75 |
| Calcium Oxide | 10 |
| Silica | 7.25 |
| Carbon Black | 5.25 |
| Silquest ® A-187 | 1.25 |

COMPARATIVE EXAMPLE 5

Comparative Sealant Composition

A composition was made by combining the components according to Table 3. 100 g of silyl-functional polysulfide (STP-2000, Toray Fine Chemicals, Japan) was first blended with 3.75 g of plasticizer, 3.30 g of T-3917, 3.00 g of T-3920, 0.75 g of T-3921, and 0.15 g of T-5143 (PRC-Desoto International, Inc., Sylmar, Calif.). Then, 8.00 g of calcium oxide, 7.20 g of silica, and 2.24 g of carbon black were added to the mixture and thoroughly mixed. Then, 17.06 g of epoxy resin (DEN 431, Dow Chemical) and 1.26 g of Silquest® A-187 were added to the mixture and thoroughly mixed. Finally, the mixture was vacuum-degassed for 15 minutes.

Lap shear samples were prepared according to Para. 7.8 of AS5127/1. The samples were allowed to cure for 14 days at 75° F./50% relative humidity. The lap shear values were reported in Table 4.

TABLE 3

| Composition | Weight, grams |
|---|---|
| Silyl-functional polysulfide STP-2000 | 100 |
| Plasticizer | 3.75 |
| Epoxy Resin | 17.06 |
| T-3917 | 3.3 |
| T-3920 | 3 |
| T-3921 | 0.75 |
| T-5143 | 0.15 |
| Calcium Oxide | 8.00 |
| Silica | 7.20 |
| Carbon Black | 2.24 |
| Silquest ® A-187 | 1.26 |

Results

TABLE 4

| Sealant Composition | Lap Shear, psi |
|---|---|
| Example 2 | 276 |
| Comparative Example 4 | 219 |
| Comparative Example 5 | 108 |

It will be appreciated by those skilled in the art that changes could be made to the embodiments described herein without departing from the broad inventive concept thereof. It is understood, therefore, that this invention is not limited to the particular embodiments disclosed, but is intended to cover modifications which are within the spirit and scope of the invention, as defined by the appended claims.

What is claimed is:

1. A polythioether comprising:
   (a) a backbone comprising a structure of formula (I):

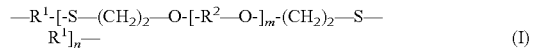

wherein:
   (i) each $R^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, a $-[(-CH_2-)_p-X-]_q-(CH_2)_r-$ group, and a $-[(-CH_2-)_p-X-]_q-(CH_2)_r-$ group in which at least one $-CH_2-$ unit is substituted with a methyl group;
   (ii) each $R^2$ is independently selected from a $C_{2-10}$ n-alkylene group, a $C_{2-6}$ branched alkylene group, a $C_{6-8}$ cycloalkylene group, a $C_{6-14}$ alkylcycloalkylene group, a heterocyclic group, and a $-[(-CH_2-)_p-X-]q-(CH_2)r-$ group;
   (iii) each X is independently selected from O, S, and a $-NR^6-$ group, in which $R^6$ is selected from H and a methyl group;
   (iv) m ranges from 1 to 50;
   (v) n is an integer ranging from 1 to 60;
   (vi) p is an integer ranging from 2 to 6;
   (vii) q is an integer ranging from 1 to 5; and
   (viii) r is an integer ranging from 2 to 10; and
   (b) at least two groups, per molecule, having the formula:

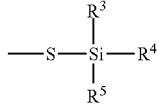

wherein $R^3$, $R^4$, and $R^5$ are each independently selected from a $C_{1-6}$ n-alkyl group, a $C_{1-6}$ branched alkyl group, a substituted $C_{1-6}$ n-alkyl group, and a phenyl group.

2. The polythioether of claim 1, wherein the polythioether is essentially free of sulfone, ester, and/or disulfide linkages.

3. A composition comprising the polythioether of claim 1 and a curing agent.

4. The composition of claim 3, wherein the curing agent comprises a polyepoxide.

5. The composition of claim 4, further comprising a basic oxide.

6. The composition of claim 5, wherein the basic oxide is selected from calcium oxide, barium oxide, magnesium oxide, and a combination of any of the foregoing.

7. A method for making the polythioether of claim 1, comprising reacting a thiol-functional polythioether with a halosilane.

8. The method of claim 7, wherein the thiol-functional polythioether comprises a structure of the formula:

HS—$R^1$-[-S—$(CH_2)_2$—O-[-$R^2$—O-]$_m$-$(Ch_2$-$)_2$-S—$R^1$]$_n$—SH.

9. The method of claim 7, wherein the thiol-functional polythioether comprises the reaction product of reactants comprising a divinyl ether and a dithiol.

10. The method of claim 9, wherein the dithiol has the structure of the formula:

HS—$R^7$—SH wherein:
$R^7$ is selected from a $C_{2-10}$ n-alkylene group, a $C_{2-6}$ branched alkylene group, a $C_{6-8}$ cycloalkylene group, a $C_{6-10}$ alkylcycloalkylene group, a -[(-$CH_2$-)$_p$-X-]$_q$-$(CH_2)_r$— group, and a -[(-$CH_2$-)$_p$-X-]$_q$-$(CH_2)_r$— group in which at least one —$CH_2$— unit is substituted with a methyl group, wherein:
p is an integer ranging from 2 to 6;
q is an integer ranging from 1 to 5;
r is an integer ranging from 2 to 10; and
X is selected from O and S.

11. The method of claim 10, wherein $R^7$ is selected from -[(-$CH_2$-)$_p$-O-]$_q$-$(CH_2)_r$— and -[(-$CH_2$-)$_p$-X-]$_q$-$(CH_2)_r$—.

12. The method of claim 11, wherein p and r are both two.

13. The method of claim 9, wherein the divinyl ether has the formula:

$CH_2$=CH—O-(-$R^8$—O—)$_m$—CH=$CH_2$ wherein:
$R^8$ is selected from a $C_{2-6}$ n-alkylene group, a $C_{2-6}$ branched alkylene group, a $C_{6-8}$ cycloalkylene group, a $C_{6-10}$ alkylcycloalkylene group, and a -[(-$CH_2$-)$_p$-O-]$_q$-$(CH_2)_r$— group, wherein:
p is an integer ranging from 2 to 6;
q is an integer ranging from 1 to 5; and
r is an integer ranging from 2 to 10; and m ranges from 1 to 50.

14. The method of claim 7, wherein the thiol-functional polythioether comprises the structure:

B(-A-SH)$_z$ wherein:
(i) A denotes a structure of formula (I);
(ii) B denotes a z-valent residue of a polyfunctionalizing agent; and
(iii) z has an average value of greater than 2.0.

15. The method of claim 7, wherein the halosilane is expressed by the general formula:

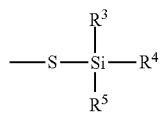

wherein:
X is a halogen atom; and
$R^3$, $R^4$, and $R^5$ are each independently selected from a $C_{1-6}$ n-alkyl group, a $C_{1-6}$ branched alkyl group, a substituted $C_{1-6}$ n-alkyl group, and a phenyl group.

16. A method of making a curable composition, comprising combining a polyepoxide and a polythioether made by the method of claim 7.

17. A composition comprising:
(a) a silyl-functional prepolymer, wherein the silyl-functional prepolymer comprises:
(A) a backbone comprising a structure of formula (I):

—$R^1$-[-S—$(CH_2)_2$—O-[-$R_2$—O-]$_m$-$(CH_2)_2$—S—$R^1$]$_n$—     (I)

wherein:
(i) each $R^1$ is independently selected from a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, a -[(-$CH_2$-)$_p$-X-]$_q$-$(CH_2)_r$— group, and a -[(-$CH_2$-)$_p$-X-]$_q$-$(CH_2)_r$— group in which at least one —$CH_2$— unit is substituted with a methyl group;
(ii) each $R^2$ is independently selected from a $C_{2-10}$ n-alkylene group, a $C_{2-6}$ branched alkylene group, a $C_{6-8}$ cycloalkylene group, a $C_{6-14}$ alkylcycloalkylene group, a heterocyclic group, and a -[(-$CH_2$-)$_p$-X-]$_q$-$(CH_2)_r$— group;
(iii) each X is independently selected from O, S, and a —$NR^6$— group, in which $R^6$ is selected from H and a methyl group;
(iv) m ranges from 1 to 50;
(v) n is an integer ranging from 1 to 60;
(vi) p is an integer ranging from 2 to 6;
(vii) q is an integer ranging from 1 to 5; and
(viii) r is an integer ranging from 2 to 10; and
(B) at least two groups, per molecule, having the formula:

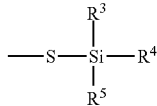

wherein $R^3$, $R^4$, and $R^5$ are each independently selected from a $C_{1-6}$ n-alkyl group, a $C_{1-6}$ branched alkyl group, a substituted $C_{1-6}$ n-alkyl group, and a phenyl group;
(b) a polyepoxide; and
(c) a basic oxide.

18. The composition of 17, wherein the basic oxide is selected from calcium oxide, barium oxide, magnesium oxide, and a combination of any of the foregoing.

19. The polythioether of claim 1, wherein the polythioether is characterized by an average functionality from 2.1 to 2.6.

20. The polythioether of claim 1, wherein,
$R^1$ is -[(-$CH_2$-)$_p$-X—]$_q$—$(CH_2)_r$— wherein X is O;
each $R^2$ is a $C_{2-10}$ n-alkanediyl group; and
m ranges from 1 to 4.

21. The composition of claim 3, formulated as a sealant.

22. The composition of claim 4, wherein the polyepoxide is selected from hydantoin diepoxide, diglycidyl ether of bisphenol-A, diglycidyl ether of bisphenol-F, Novalac type epoxides, an epoxidized unsaturated resin, an epoxidized phenolic resin, and a combination of any of the foregoing.

23. The composition of claim 4, wherein the polyepoxide comprises a Novalac type epoxide.

24. The composition of claim 4, wherein,
$R^1$ is -[(-$CH_2$-)$_p$-X—]$_q$—$(CH_2)_r$— wherein X is O;
each $R^2$ is a $C_{2-10}$ n-alkanediyl group;
m ranges from 1 to 4; and
the polyepoxy comprises a Novalac type epoxide.

* * * * *